(12) United States Patent
Besson et al.

(10) Patent No.: US 7,910,854 B2
(45) Date of Patent: Mar. 22, 2011

(54) METHOD OF DECORATING A CERAMIC PART

(75) Inventors: François Besson, Fiez (CH); Sylvain Boucard, Villers-le-lac (FR)

(73) Assignee: Comadur S.A., Le Locle (CH)

( * ) Notice: Subject to any disclaimer, the term of this patent is extended or adjusted under 35 U.S.C. 154(b) by 703 days.

(21) Appl. No.: 11/690,469

(22) Filed: Mar. 23, 2007

(65) Prior Publication Data

US 2007/0228007 A1 Oct. 4, 2007

(30) Foreign Application Priority Data

Mar. 28, 2006 (EP) .................................... 06111850

(51) Int. Cl.
*B23K 26/14* (2006.01)
*B23K 26/08* (2006.01)
*C04B 35/565* (2006.01)

(52) U.S. Cl. .................. 219/121.6; 219/121.59; 501/87; 501/92

(58) Field of Classification Search ............. 219/121.59, 219/121.69, 121.85; 216/65, 67; 427/553; 501/87, 92, 103

See application file for complete search history.

(56) References Cited

U.S. PATENT DOCUMENTS 5,928,977 A * 7/1999 Magnin et al. .................. 501/87
2003/0071020 A1 * 4/2003 Hong et al. ............. 219/121.69

FOREIGN PATENT DOCUMENTS

| EP | 0 741 117 A1 | 11/1996 |
| EP | 0 850 900 A1 | 7/1998 |
| EP | 1 160 224 A1 | 12/2001 |

OTHER PUBLICATIONS

Stolz, B. et al., "Laser-induced writing of electrically conductive structures in the surface of AlN," SPIE Conference on Smart Materials Technologies, Mar. 1999, pp. 190-201.
Gakovic, Biljana M. et al., "TEA CO2 Laser Surface Modification of Titanium Ceramic Thin Films," High-Power Laser Ablation IV, Proceedings of SPIE vol. 4760, 2002, pp. 1006-1013.
European Search Report issued in corresponding application No. EP 06 11 1850, completed Jul. 19, 2006.

\* cited by examiner

*Primary Examiner* — Tu B Hoang
*Assistant Examiner* — Brian Jennison
(74) *Attorney, Agent, or Firm* — Griffin & Szipl, P.C.

(57) ABSTRACT

The invention proposes a method of locally colouring a part made of ceramic material of the metallic oxide type mainly including the following steps of taking a support for the part and a laser, able to move relative to each other in an XY plane, performing a plasma treatment of the part using a gas containing one element selected from among nitrogen an carbon, so as to convert a surface layer of metallic oxide, into a substantially stoichiometric ceramic chosen from among metal nitrides and carloides, locally illuminating the part with the laser beam so as to provide sufficient energy to cause a local change in colour by altering the stoichiometry of the surface layer, and scanning the surface of the part using the laser beam so as to form a determined pattern.

6 Claims, No Drawings

METHOD OF DECORATING A CERAMIC PART

This application claims priority from European Patent Application No. 06111850.1, filed Mar. 28, 2006, the entire disclosure of which is incorporated herein by reference.

FIELD OF THE INVENTION

The invention relates to the field of microtechnology. It concerns more particularly a method for the local colouring of a ceramic part.

BACKGROUND OF THE INVENTION

Ceramics such as zirconia $ZrO_2$ or alumina $Al_2O_3$ are widely employed in horology for making scratchproof cases, watchbands or bracelets. The colour of pure zirconia or pure alumina is a milky white which has few applications in horology.

Methods for colouring zirconia are already widely used by ceramic manufacturers. They generally consist in introducing a pigment or an oxide in a powder state into the zirconium oxide based mixture, prior to an injection moulding step. However, this type of method does not allow designs to be made on ceramic part, since the latter are coloured throughout.

Moreover, a local colouring method for zirconium oxide is disclosed in EP Patent No 0 741 117. This method consists in illuminating the surface of a zirconium oxide part, for a sufficiently long time to obtain a change in colour from milky white to black. It enables an image to be formed, but the contrast obtained, black on milky white, is very strong and unattractive.

SUMMARY OF THE INVENTION

It is an object of the invention to provide a coloration method for locally colouring a ceramic part allowing patterns having a reduced contrast to be obtained.

More particularly, the invention proposes a method of locally colouring a part made of ceramic material of the metallic oxide type mainly including the following steps:
  taking a support for the part and a laser, able to move relative to each other in an XY plane,
  Performing a plasma treatment of the part using a gas containing one element selected from among nitrogen an carbon, so as to convert a surface layer of metallic oxide, into a substantially stoichiometric ceramic chosen from among metal nitrides and carloides.
  locally illuminating the part with the laser beam so as to provide sufficient energy to cause a local change in colour by altering the stoichiometry of the surface layer, and
  scanning the surface of the part using the laser beam so as to form a determined pattern.

DETAILED DESCRIPTION OF THE INVENTION

Other features will appear more clearly upon reading the following description of an example implementation of the method according to the invention.

A part made of pure zirconia $ZrO_2$ is used for the method according to the invention. Pure zirconia means a zirconium oxide $ZrO_2$ allied with an yttrium, calcium, magnesium or scandium oxide, for stabilising the zirconia. In a variant of the method, another metallic oxide could be used, for example aluminium oxide $Al_2O_3$. The part is, for example, a watchcase or bracelet link. Its surface is polished, but in a variant of the method, it could be matt or have a satin finish.

The first step of the method consists in performing a plasma treatment on the surface of the piece in order to nitride harden it. In order to do so, the piece is placed in a chamber under vacuum, at a temperature comprised between 500° C. and 900° C., and a gas such as ammoniac NH3 or a mixture of hydrogen and nitrogen is introduced. Plasma is established in the chamber and the part is subjected to the action of the plasma for a determined time period. Via the effect of the plasma, the part is totally surface nitride hardened over a thickness of the order of a micron and more, i.e. an external layer of substantially stoichiometric ZrN is formed. The surface has a golden colour. The zirconia part is further reduced to the core thereof, i.e. over the whole of its volume. This type of treatment is described in detail in EP Patent Application NO 1 160 224. It will be noted that in the case where the parte treated is an aluminium oxide, the external layer formed is made of aluminium nitride AlN.

In a variant of the method, the first step consists of a plasma treatment for carburising the surface of the part. The principle is similar, but the gas used is methane CH4. The surface is totally carburised over a thickness of the order of a micron and more, i.e. a substantially stoichiometric external layer of ZrC is formed. The surface has a metallic colour. Moreover, the zirconia is reduced to the core thereof. This type of treatment is described in detail in EP Patent Application No 0 850 900. It will be noted that in the case where the treated part is made of aluminium oxide, the external layer formed is made of aluminium carbide AlC.

The second step of the method consists in locally illuminating the surface thereby treated using a laser. In order to do so, the part is arranged on a support, above a laser that moves in an XY plane, and whose movement is computer controlled. The laser is of the Nd:YAG pulse type, optically pumped, with a wavelength of 1.06 μm, and optical strength of 75 W. The laser is used in Q-switched mode. The size of the spot is 100 μm, the pulse frequency is of the order of 80 to 100 kHz and the width is 100 μs. The scanning speed is of the order of 10 to 20 mm/s. A design is selected and converted, by suitable software, into a series of laser movement commands. The laser beam thus scans the surface of the part to form the selected pattern.

Via the effect of the laser ray, and provided that sufficient energy is provided locally, the illuminated surface changes colour. The colour contrast created between the illuminated zones and the non-illuminated zones, forms the selected pattern on the surface of the part. The colour change results from an alteration in the stoichiometry of the nitride or carbide located at the surface, possibly accompanied by partial re-oxidisation, due to the presence of oxygen in the atmosphere.

It will be noted that the present invention is not limited to the example implementation of the method that has just been described, and that various simple alterations and variants can be envisaged by those skilled in the art without departing from the scope of the invention as defined by the annexed claims.

In particular, the method of colouring a ceramic material according to the invention can be applied to a solid metal carbide or nitride part, such as zirconium carbide ZrC, titanium carbide TiC, titanium nitride TiN, etc. In such case, the plasma treatment step is optional, and the laser colouring step alone can be performed in order to obtain a pattern by colour contrast.

What is claimed is:

1. A method of locally colouring a part made of ceramic material of metallic oxide, the method including the following steps:
   (a) providing a part made of metallic oxide, and a support,
   (b) arranging the part on the support,
   (c) providing a laser, wherein the laser and the support are movable relative to each other in an XY plane,
   (d) performing a plasma treatment on the part using a gas containing one element selected from among nitrogen and carbon, thereby converting, in a surface layer of the part, metallic oxide into a substantially stoichiometric ceramic material chosen from among metal nitrides and metal carbides,
   (e) illuminating the part locally with a laser beam from the laser, thereby providing sufficient energy to cause a local change in colour in said surface layer of the part of step (d) by altering the stoichiometry of said substantially stoichiometric ceramic material chosen from among metal nitrides and metal carbides, wherein the local change in colour in the surface layer of the part is obtained by alteration of said stoichiometry of the substantially stoichiometric ceramic material chosen from among metal nitrides and metal carbides, and
   (f) scanning the surface layer of the part using the laser beam, thereby forming a determined pattern on said surface layer of the part.

2. The method according to claim 1, wherein the metallic oxide is chosen from among zirconium oxide, aluminium oxide and titanium oxide.

3. The method according to claim 1, wherein the plasma treatment is performed using a gas containing carbon, thereby converting, in a surface layer of the part, metallic oxide into a substantially stoichiometric ceramic material of metal carbide.

4. The method according to claim 1, wherein the plasma treatment is performed using a gas containing nitrogen, thereby converting, in a surface layer of the part, metallic oxide into a substantially stoichiometric ceramic material of metal nitride.

5. The method according to claim 1, wherein the part is reduced to the core.

6. The method according to claim 1, wherein the laser is operated with an optical strength of 75 W and a pulse frequency of 80 to 100 kHz.

* * * * *